(12) United States Patent  (10) Patent No.: US 12,492,790 B2
Kim  (45) Date of Patent: Dec. 9, 2025

(54) LIGHTING APPARATUS FOR VEHICLE

(71) Applicant: Moplat Inc., Busan (KR)

(72) Inventor: Tae Woong Kim, Seoul (KR)

(73) Assignee: Moplat Inc., Busan (KR)

( * ) Notice: Subject to any disclaimer, the term of this patent is extended or adjusted under 35 U.S.C. 154(b) by 49 days.

(21) Appl. No.: 18/650,128

(22) Filed: Apr. 30, 2024

(65) Prior Publication Data

US 2025/0334240 A1  Oct. 30, 2025

(51) Int. Cl.
*F21S 41/19* (2018.01)
*B60Q 1/50* (2006.01)
*F21S 41/153* (2018.01)
*F21S 41/20* (2018.01)

(52) U.S. Cl.
CPC ............ *F21S 41/192* (2018.01); *B60Q 1/543* (2022.05); *F21S 41/153* (2018.01); *F21S 41/285* (2018.01)

(58) Field of Classification Search
CPC ...... F21S 41/192; F21S 41/153; F21S 41/285; B60Q 1/543
See application file for complete search history.

(56) References Cited

U.S. PATENT DOCUMENTS

| 9,714,749 | B1 * | 7/2017 | Salter | F21S 43/245 |
| 2015/0077327 | A1 * | 3/2015 | Pisz | G06V 40/16 345/7 |
| 2015/0154896 | A1 * | 6/2015 | Dellock | F21S 10/023 362/546 |
| 2017/0240100 | A1 * | 8/2017 | Salter | B60R 13/005 |
| 2019/0271458 | A1 * | 9/2019 | Brown | F21S 41/285 |

FOREIGN PATENT DOCUMENTS

| KR | 10-2010-0084211 A | 7/2010 |
| KR | 20-0482293 Y1 | 1/2017 |
| WO | 2015/042005 A1 | 3/2015 |

* cited by examiner

*Primary Examiner* — Patrick C Chen
(74) *Attorney, Agent, or Firm* — ZION IP; Byungwoong Park

(57) ABSTRACT

A lighting apparatus for a vehicle is disclosed. The lighting apparatus may include a body made of a flexible material and having a predetermined grid pattern on an outer surface, a light emitting unit including a plurality of light emitting devices installed along the grid pattern, and a control unit to generate a signal related to operation of the light emitting devices, wherein the light emitting unit is disposed at a front part of the vehicle, and the control unit is installed at a location inside the vehicle spaced a preset distance or more apart from the light emitting unit.

6 Claims, 4 Drawing Sheets

LIGHTING APPARATUS FOR VEHICLE

BACKGROUND

1. Field

The present disclosure relates to a lighting apparatus for a vehicle.

2. Description of the Related Art

In general, a vehicle has a lighting apparatus to help a driver to see an object in the direction of travel while driving at night and inform the driving condition of the vehicle to another vehicle or a user on the road.

The conventional lighting apparatus for the vehicle is used only for specific and limited purposes.

In particular, many studies related to electric vehicles are being conducted, and when considering the recent technology trends in vehicles as electronic devices, the lighting apparatus for the vehicle that can be used only for limited purposes limits user convenience.

On the other hand, the lighting apparatus installed at the front part of the vehicle has a high damage risk due to the exposure to external collisions, and thus for stability of the lighting apparatus, precautions against external collisions are needed.

SUMMARY

A technical object of the present disclosure is to provide a lighting apparatus for a vehicle that can stably operate in the event that external collisions occur.

A technical object of the present disclosure is to provide a lighting apparatus for a vehicle that can act as a user interface of the vehicle.

A technical object of the present disclosure is to provide a lighting apparatus for a vehicle that can be used not only in lighting applications to illuminate objects but also in any other applications.

To solve the above-described problem, the lighting apparatus according to an aspect of the present disclosure includes: a body made of a flexible material and having a predetermined grid pattern on an outer surface, a light emitting unit including a plurality of light emitting devices installed along the grid pattern, and a control unit configured to generate a signal related to operation of the light emitting devices, wherein the light emitting unit is disposed at a front part of the vehicle, and the control unit is installed at a location inside the vehicle spaced a preset distance or more apart from the light emitting unit.

In an embodiment, the light emitting unit is installed on an outer surface of a grill of the vehicle, and the control unit is installed inside the vehicle spaced a predetermined distance or more apart from an outer surface of the vehicle.

In an embodiment, the lighting apparatus further includes a bus unit configured to make communication connection between the light emitting unit and the control unit, wherein the bus unit is installed inside the vehicle spaced a predetermined distance or more apart from the outer surface of the vehicle.

In an embodiment, the bus unit communicates with the vehicle, and receives, from the vehicle, user information transmitted to the vehicle from a user device having established communication connection with the vehicle.

In an embodiment, the control unit is configured to select at least one information to be outputted to the light emitting unit from a plurality of information based on the user information received from the bus unit, and to control the operation of the light emitting unit to output the selected information.

In an embodiment, the plurality of information to be outputted to the light emitting unit includes information related to at least one of an operational condition of the vehicle, a remaining battery capacity of the vehicle, a remaining fuel of the vehicle, a fault or failure in the vehicle, a surrounding environment of the vehicle, a driving path of the vehicle, a still image or a video.

In an embodiment, the user information includes information related to at least one of a user profile, a destination or an item of interest.

In an embodiment, the control unit is configured to receive the information related to the operational condition of the vehicle from the bus unit, to determine whether or not the vehicle is in drive based on the received information related to the operational condition of the vehicle, and to control the operation of the light emitting unit based on a result of the determination.

In an embodiment, the control unit is configured to activate the operation of the light emitting unit when the control unit determines that the vehicle is not in drive, and to inactivate the operation of the light emitting unit when the control unit determines that the vehicle is in drive.

In an embodiment, the lighting apparatus further includes a diffusion unit configured to diffuse light from the light emitting unit, wherein the diffusion unit is made of a polypropylene composite resin.

According to the present disclosure, the lighting apparatus for the vehicle can assist the driver while driving, but its use is not limited to the purpose for assistance of driving. As the lighting apparatus may output various types of information, the convenience of the user of the vehicle can be improved.

Additionally, according to the present disclosure, it may be possible to prevent damage to the expensive PCB (Printed Circuit Board) substrate in the event that external impacts are applied to the vehicle, thereby improving the operational stability of the lighting apparatus for the vehicle.

DETAILED DESCRIPTION OF EXEMPLARY EMBODIMENTS

The terms used herein will be briefly described and an embodiment of the present disclosure will be described in detail. The terms as used herein are general terms selected as those being now used as widely as possible taking into account the functions in the present disclosure, but may vary depending on the intention of those skilled in the art or the convention or the emergence of new technology. Additionally, in certain cases, there may be terms arbitrarily selected by the applicant, and in this case, the meaning will be described in detail in the corresponding description part of the specification. Accordingly, the terms used herein should be defined based on the meaning of the terms and the entire description of the present disclosure rather than simply the name of the terms.

Prior to the detailed description of the present disclosure, "vehicle" as used herein may refer to an electric vehicle but is not limited thereto. For example, the vehicle in the present disclosure may refer to an internal combustion engine vehicle or any other means for transportation.

Hereinafter, an embodiment according to the present disclosure will be described in detail with reference to the accompanying drawings.

Figure 1:
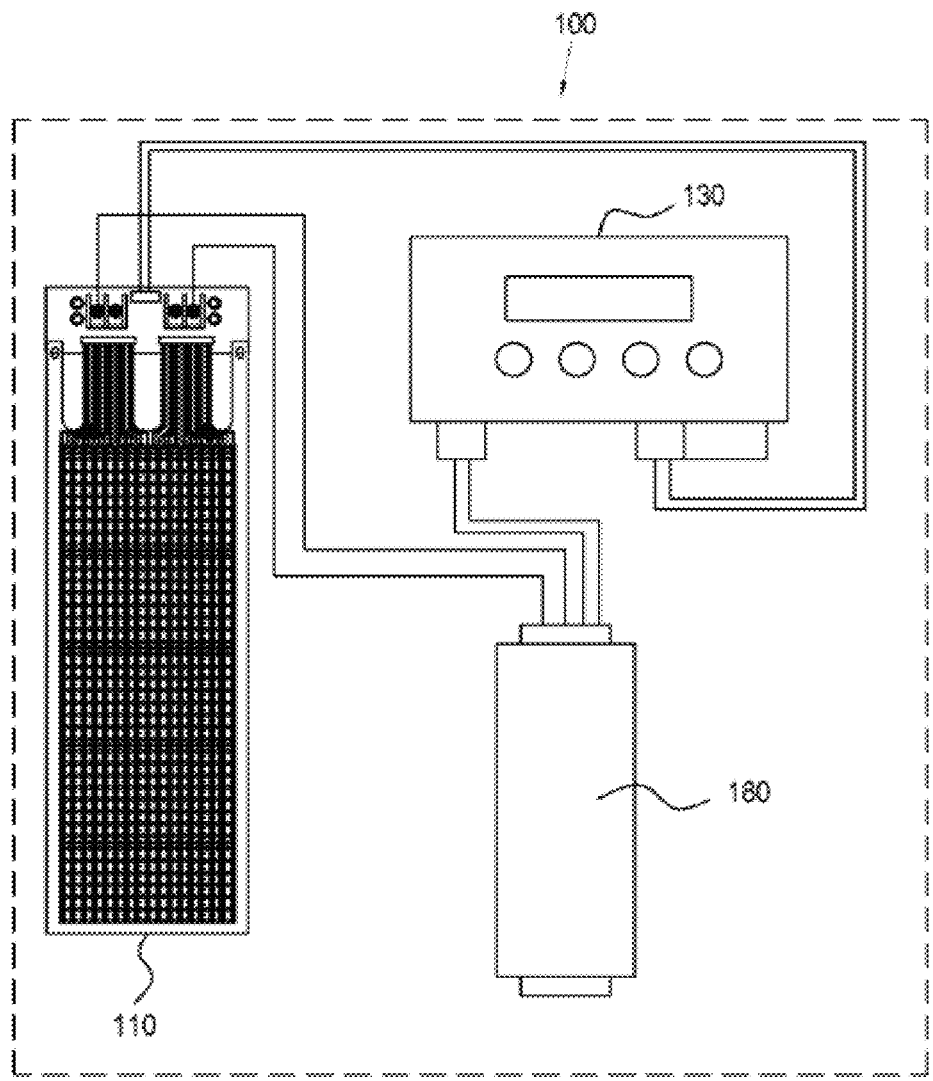
FIG. 1 is a conceptual diagram showing an embodiment of a lighting apparatus 100 for a vehicle according to the present disclosure.

FIG. 1 shows an embodiment of a lighting apparatus 100 for a vehicle according to the present disclosure.

Referring to FIG. 1, an embodiment of the lighting apparatus 100 for the vehicle may include a light emitting unit 110, a bus unit 120 and a control unit 130. The lighting apparatus 100 may also include a power unit 180.

In an embodiment, the light emitting unit 110 may be installed on a body made of a flexible material and having a predetermined grid pattern on the outer surface. Additionally, the light emitting unit 110 may include a plurality of light emitting devices installed along the grid pattern.

In an embodiment, the control unit 130 may generate a signal related to the operation of the light emitting devices.

In an embodiment, the light emitting unit 110 may be disposed at the front part of the vehicle, and the control unit 130 may be installed at a location inside the vehicle spaced a preset distance or more apart from the light emitting unit.

Like conventional light emitting diode (LED) panels, when an external collision is applied to the vehicle while the light emitting devices are disposed near a printed circuit board (PCB) substrate, the light emitting devices as well as the PCB substrate can be damaged.

When the PCB substrate, whose price is relatively high, is damaged by the minor external collision, the stability of the lighting apparatus for the vehicle is notably decreased.

Accordingly, an aspect of the present disclosure proposes the lighting apparatus 100 for the vehicle with high resistance to external impacts, in which the light emitting unit 110 is installed at the front part of the vehicle or another outside part of the vehicle whereas the control unit 130 for operating the light emitting unit 110 is installed inside the vehicle.

To this end, the lighting apparatus 100 for the vehicle according to the present disclosure may include the bus unit 120 to make communication connection between the light emitting unit 110 and the control unit 130.

Figure 2:
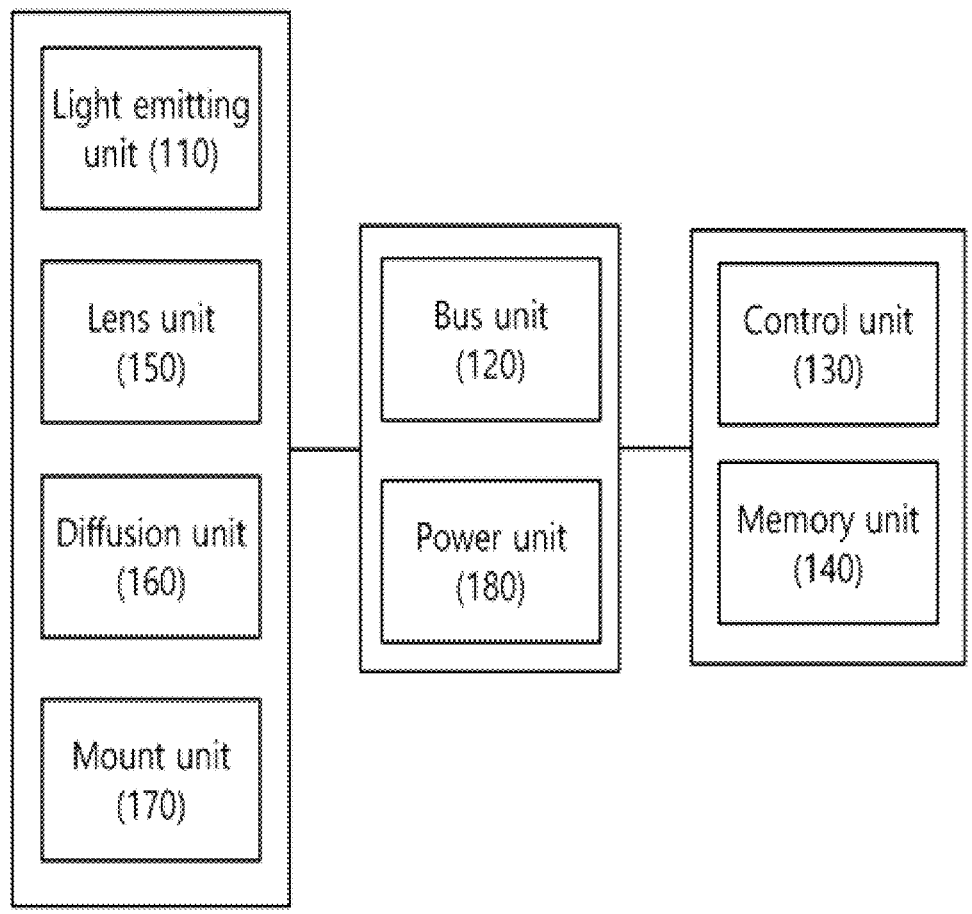
FIG. 2 is a block diagram showing the components of a lighting apparatus 100 for a vehicle according to the present disclosure.

FIG. 2 is a block diagram showing the components of the lighting apparatus 100 for the vehicle according to the present disclosure.

As shown in FIG. 2, the lighting apparatus 100 for the vehicle may include at least one of the light emitting unit 110, the bus unit 120, the control unit 130, a memory unit 140, a lens unit 150, a diffusion unit 160, a mount unit 170 or the power unit 180.

Specifically, the light emitting unit 110 may include the plurality of LED devices.

The light emitting unit 110 may output various types of information when the vehicle is not in motion.

In an example, the light emitting unit 110 may output information related to the operational condition of the vehicle when the vehicle is not in motion.

Specifically, when the vehicle is an electric vehicle, the light emitting unit 110 may output information related to the remaining battery capacity of the vehicle. Additionally, when the vehicle is an internal combustion engine vehicle, the light emitting unit 110 may output information related to the remaining fuel of the vehicle.

Additionally, the light emitting unit 110 may output information related to a fault or failure in the vehicle. Preferably, the light emitting unit 110 may output information related to the cause of the fault or failure, the faulty or failed component and whether the vehicle can drive or not.

In another example, the light emitting unit 110 may operate the plurality of light emitting devices to output a video that moves in a preset pattern.

In another example, the light emitting unit 110 may output information related to the environment of the vehicle. In this instance, the information related to the environment of the vehicle may include information related to at least one of the vehicle's ambient temperature, humidity, fine dust or expected rainfall amount.

In another example, the light emitting unit 110 may output information related to a pre-inputted driving path of the vehicle. Furthermore, the light emitting unit 110 may output information related to the required time to the destination.

In another example, the light emitting unit 110 may output information related to a predetermined text. In this instance, the predetermined text may be a pre-inputted text from the vehicle user, and may be an arbitrary text received from an external server.

The components of the light emitting unit 110 will be described below in more detail with reference to FIG. 3.

The bus unit 120 may be configured to allow the light emitting unit 110, the control unit 130 and the memory unit 140 to communicate with one another.

Furthermore, the bus unit 120 may be configured to enable communication connection with the vehicle 1 corresponding to the lighting apparatus 100 for the vehicle. That is, the bus unit 120 may receive various types of information from the vehicle 1 or transmit information to the vehicle 1.

In an example, the bus unit 120 may receive user information received by the vehicle 1 from the user's mobile device. Through this, the lighting apparatus 100 for the vehicle may be connected directly and/or indirectly to the user's mobile device having the established communication connection with the vehicle 1, and receive the information transmitted from the mobile device to the vehicle 1.

The control unit 130 may control the operation of each of the components included in the lighting apparatus 100 for the vehicle. Specifically, the control unit 130 may generate an operation command signal for controlling the operation of each of the light emitting unit 110 or the memory unit 140, and transmit the corresponding operation command signal to the corresponding component through the bus unit 120.

Likewise, the control unit 130 may receive the signal related to the operational condition of the light emitting unit 110 or the memory unit 140 through the bus unit 120, and generate another operation command signal related to the operation of the lighting apparatus 100 for the vehicle based on the received signal.

Meanwhile, the control unit 130 may select at least one of the plurality of information to be outputted to the light emitting unit 110 based on the user information corresponding to the vehicle.

In this instance, the user information may include information related to at least one of a user profile, a destination or an item of interest.

Specifically, the control unit 130 may select at least one of the plurality of information to be outputted to the light emitting unit 110 based on the user information received from the user's mobile device. In this instance, the plurality of information to be outputted to the light emitting unit 110 is as described above.

The memory unit 140 may pre-store information related to an operation pattern of the light emitting unit 110. Furthermore, the memory unit 140 may store information related to at least one of the vehicle corresponding to the lighting apparatus 100 for the vehicle, the vehicle user, the vehicle's environment, the vehicle's operational condition or the vehicle's driving history.

The above-described information is provided by way of example, and it is obvious that the memory unit 140 may store different formats of information without limitation, as necessary.

The lens unit 150 may be configured to emit light from the light emitting unit 110 at a predetermined angle of emergence.

The diffusion unit 160 may diffuse the light from the light emitting unit 110.

In an example, the diffusion unit 160 may be made of polypropylene composite resin.

The mount unit 170 may couple the light emitting unit 110 to a part of the vehicle.

The power unit 180 may apply power to the components of the lighting apparatus 100 for the vehicle.

Figure 3:
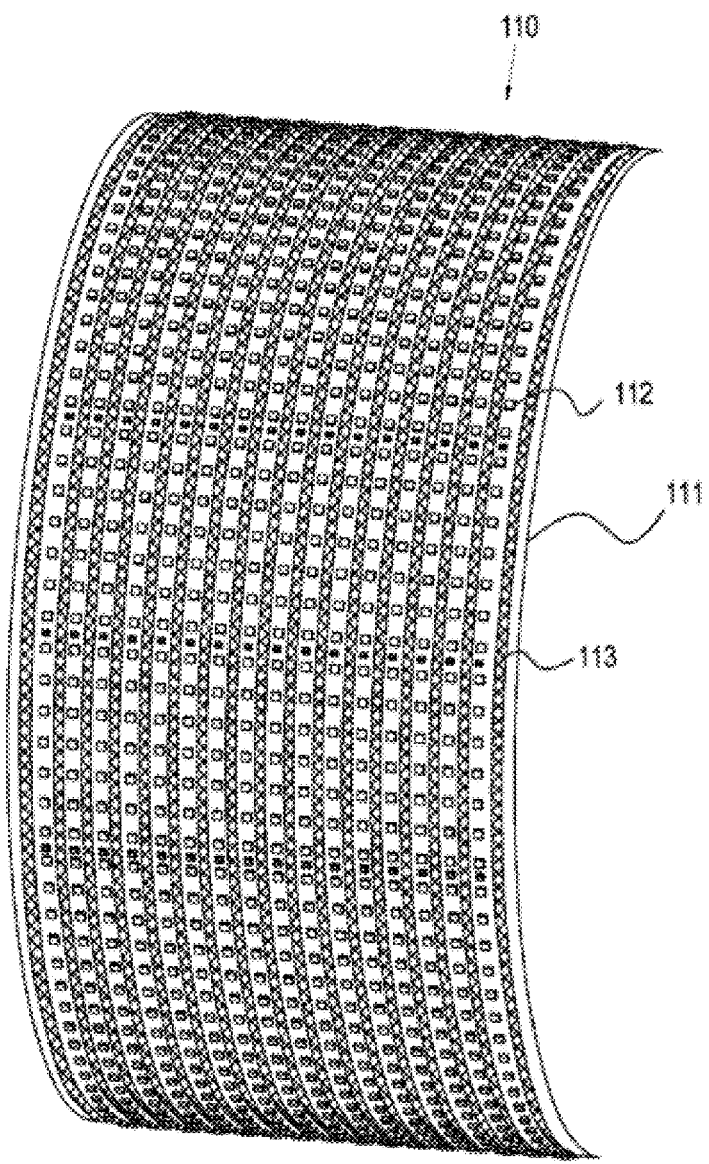
FIG. 3 is a conceptual diagram showing a light emitting diode (LED) panel 110 included in a lighting apparatus 100 for a vehicle according to the present disclosure.

FIG. 3 is a conceptual diagram showing an embodiment of the light emitting unit 110 including the LED devices.

Referring to FIG. 3, the light emitting unit 110 may include at least one of the body 111, the light emitting devices 112 or a conducting layer 113.

Specifically, the body 111 and the conducting layer 113 may be made of a flexible material.

In an example, the plurality of light emitting devices 112 may be installed on the body 111 in the grid pattern. In this instance, the control unit 130 may independently operate the plurality of light emitting devices 112 to control the light emitting unit 110 to output specific information.

In an embodiment, the light emitting unit 110 may be installed on the outer surface of the vehicle to provide information to be outputted to the user. Meanwhile, the control unit may be installed inside the vehicle spaced the predetermined distance or more apart from the outer surface of the vehicle to avoid external impact-induced damage.

For example, the light emitting unit 110 may be installed on the outer surface of the grill of the vehicle. In this case, the mount unit 170 may be installed between the light emitting unit 110 and the grill to fix the light emitting unit 110 at a specific location.

Meanwhile, the light emitting unit 110 may be installed on the side of the grill of the vehicle. In this case, while the vehicle is in drive, to make the light emitting unit 110 operate in the same way as the conventional lights, the control unit 130 may control the operation of the light emitting unit 110 in reliance on a command related to the operation of the lights received from the vehicle.

In another example, when the light emitting unit 110 operates in the same way as the existing lights while the vehicle is in drive, the light emitting unit 110 may be under the direct control of a control module (not shown) that controls the lights of the vehicle.

Figure 4:
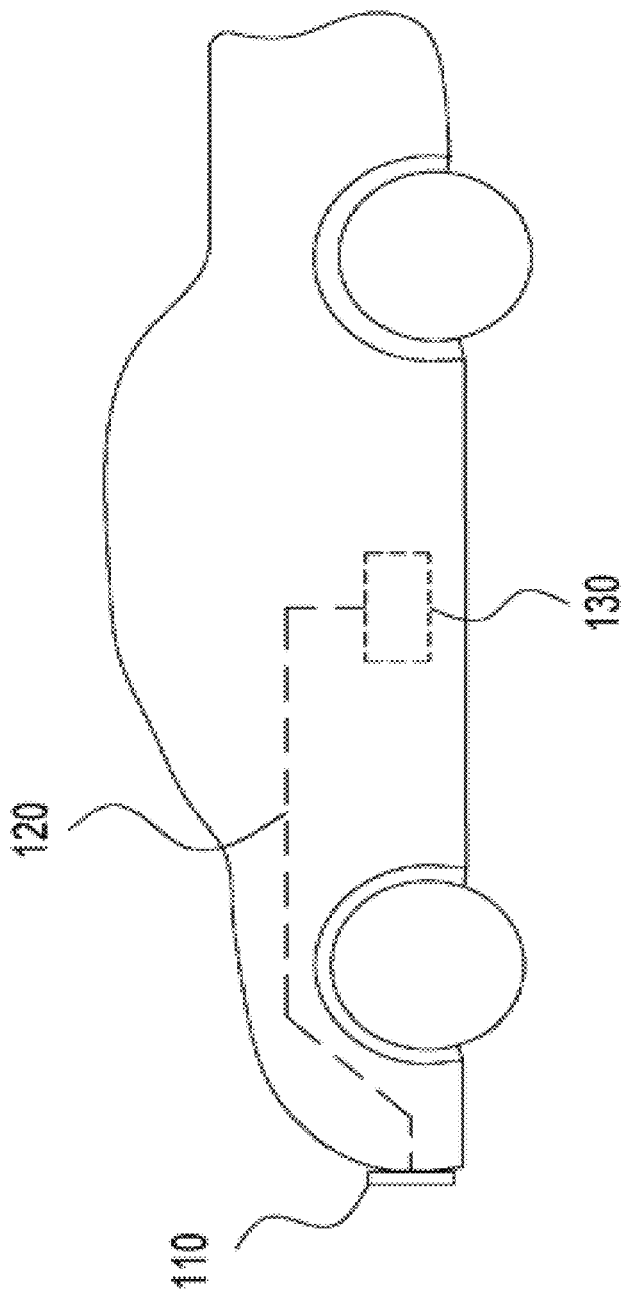
FIG. 4 is a conceptual diagram showing an embodiment of operation of a lighting apparatus 100 for a vehicle according to the present disclosure.

Hereinafter, FIG. 4 shows an embodiment related to a display of the lighting apparatus 100 for the vehicle according to the present disclosure.

FIG. 4 illustrates an embodiment related to the operation of the lighting apparatus 100 for the vehicle when the user transmits a signal including a predetermined command to the vehicle by using the mobile device.

As shown in FIG. 4, when the user's mobile device moves within a predetermined distance with respect to the vehicle 1, the lighting apparatus 100 for the vehicle may receive user information transmitted from the mobile device through the bus unit 120 that communicates with the vehicle 1.

In this case, the control unit 130 may select information to be outputted to the light emitting unit 110 based on the user information.

For example, the user information may include information related to priority of the information to be outputted to the lighting apparatus 100 for the vehicle. In this case, the control unit 130 may control the operation of the light emitting unit 110 to output information corresponding to the priority in a sequential order based on the received user information. That is, when the remaining battery capacity of the vehicle is assigned to the highest priority and the fault or failure in the vehicle is assigned to the second highest priority among the information corresponding to the priority, the control unit 130 may control the operation of the light emitting unit 110 to output the information related to the remaining battery capacity of the vehicle first, and then shift to the information related to the fault or failure in the vehicle.

The control unit 130 may control the operation of the light emitting unit 110 to change the information to be outputted to the light emitting unit 110 according to the user input to the mobile device. For example, even though the control unit 130 is operating the light emitting unit 110 to sequentially output the plurality of information according to a preset order, when the user input related to the driving path is entered in the mobile device, the control unit 130 may control the operation of the light emitting unit 110 to output the information related to the driving path.

Meanwhile, when the user input related to an image is entered in the mobile device, the control unit 130 may control the operation of the light emitting unit 110 to output the image to the light emitting unit 110.

In this instance, when the number of pixels of the image corresponding to the user input to the mobile device exceeds the output pixel range of the light emitting unit 110, the control unit 130 may convert the image to downscale the image to reduce the number of pixels in the image.

In another embodiment, the control unit 130 may activate the operation of the light emitting unit 110 when it determines that the vehicle is not in drive, and inactivate the operation of the light emitting unit 110 when it determines that the vehicle is in drive.

The lighting apparatus described in the present disclosure may have aspects of entirely hardware, or partly hardware and partly software. For example, the lighting apparatus may refer collectively to a device for controlling the generation and transmission of light using an electronic communication method and its related software. The term "unit", "module", "server", "system", "platform", "device" or "terminal" as used herein is intended to refer to a combination of hardware and software run by the corresponding hardware. For example, here, the hardware may be a data processing device including a central processing unit (CPU) or other processor. Additionally, the software run by the hardware may refer to a process being executed, an object, an executable, a thread of execution and a program.

The lighting apparatus according to embodiments as described hereinabove may be, at least in part, implemented using a computer program recorded in a computer-readable recording medium. The computer-readable recording medium that records a program for implementing the operation by the lighting apparatus includes any type of recording device in which computer-readable data is stored. Examples of the computer-readable recording medium include ROM, RAM, CD-ROM, magnetic tape, floppy disk, optical data storage devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

Although the present disclosure has been hereinabove described with reference to the embodiments shown in the drawings, this is provided by way of illustration and those skilled in the art will understand that a variety of modifications and variations may be made thereto. However, it should be understood that such modifications fall within the scope of technological protection of the present disclosure.

What is claimed is:

1. A lighting apparatus for a vehicle comprising:
   a body made of a flexible material, and having a predetermined grid pattern on an outer surface;
   a light emitting unit including a plurality of light emitting devices installed along the grid pattern;
   a control unit including a printed circuit board (PCB) substrate and is configured to generate a signal related to operation of the light emitting devices; and
   a bus unit configured to make communication connection between the light emitting unit and the control unit,
   wherein the light emitting unit is installed on an outer surface of a grill at a front part of the vehicle,
   wherein the control unit including the PCB is installed inside the vehicle spaced a predetermined distance or more apart from an outer surface of the vehicle,
   wherein the bus unit is installed inside the vehicle spaced a predetermined distance or more apart from the outer surface of the vehicle,
   wherein the bus unit is configured to:
   communicate with the vehicle, and
   receive, from the vehicle, user information transmitted to the vehicle from a user device having established communication connection with the vehicle, and
   wherein the control unit is configured to:
   select at least one information to be outputted to the light emitting unit from a plurality of information based on the user information received from the bus unit, and
   control operation of the light emitting unit to output the selected information.

2. The lighting apparatus for the vehicle according to claim 1, wherein the plurality of information to be outputted to the light emitting unit includes information related to at least one of an operational condition of the vehicle, a remaining battery capacity of the vehicle, a remaining fuel of the vehicle, a fault or failure in the vehicle, a surrounding environment of the vehicle, a driving path of the vehicle, a still image and a video.

3. The lighting apparatus for the vehicle according to claim 1, wherein the user information includes information related to at least one of a user profile, a destination and an item of interest.

4. The lighting apparatus for the vehicle according to claim 1, wherein the control unit is further configured to:
   receive information related to operational condition of the vehicle from the bus unit,
   determine whether or not the vehicle is in drive based on the received information related to the operational condition of the vehicle, and
   control the operation of the light emitting unit based on a result of the determination.

5. The lighting apparatus for the vehicle according to claim 4, wherein the control unit is further configured to:
   activate the operation of the light emitting unit when the control unit determines that the vehicle is not in drive, and
   inactivate the operation of the light emitting unit when the control unit determines that the vehicle is in drive.

6. The lighting apparatus for the vehicle according to claim 1, further comprising a diffusion unit configured to diffuse light from the light emitting unit, wherein the diffusion unit is made of a polypropylene composite resin.

* * * * *